(12) United States Patent
Hong

(10) Patent No.: US 12,406,175 B2
(45) Date of Patent: Sep. 2, 2025

(54) METHOD AND APPARATUS WITH MODEL OPTIMIZATION, AND ACCELERATOR SYSTEM

(71) Applicant: Samsung Electronics Co., Ltd., Suwon-si (KR)

(72) Inventor: Jae-Ki Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1211 days.

(21) Appl. No.: 16/923,382

(22) Filed: Jul. 8, 2020

(65) Prior Publication Data

US 2021/0174202 A1 Jun. 10, 2021

(30) Foreign Application Priority Data

Dec. 10, 2019 (KR) ........................ 10-2019-0163853

(51) Int. Cl.
*G06N 3/063* (2023.01)
*G06F 9/50* (2006.01)
*G06F 18/20* (2023.01)
*G06F 18/21* (2023.01)
*G06N 3/08* (2023.01)
*G06N 20/00* (2019.01)

(52) U.S. Cl.
CPC ........... *G06N 3/063* (2013.01); *G06F 9/5027* (2013.01); *G06F 18/217* (2023.01); *G06F 18/29* (2023.01); *G06N 3/08* (2013.01); *G06N 20/00* (2019.01)

(58) Field of Classification Search
None
See application file for complete search history.

(56) References Cited

U.S. PATENT DOCUMENTS

| 9,972,063 | B2 | 5/2018 | Ashari et al. |
| 10,146,738 | B2 | 12/2018 | Nurvitadhi et al. |
| 10,180,928 | B2 | 1/2019 | Nurvitadhi et al. |
| 10,402,731 | B1 | 9/2019 | Cosic |
| 2017/0193361 | A1 | 7/2017 | Chilimbi et al. |
| 2018/0247197 | A1 | 8/2018 | Tucker et al. |
| 2018/0302498 | A1 | 10/2018 | Xie et al. |
| 2019/0102671 | A1 | 4/2019 | Cohen et al. |

(Continued)

FOREIGN PATENT DOCUMENTS

EP 3 396 600 A1 10/2018
KR 10-2019-0081373 A 7/2019

OTHER PUBLICATIONS

Hadjis, S. et al., "TensorFlow to cloud FPGAs: tradeoffs for accelerating deep neural networks," 2019 29th Intl. Conf. on Field Programmable Logic and Applications (FPL) (Nov. 2019) pp. 360-366. (Year: 2019).*

(Continued)

*Primary Examiner* — Brian M Smith
(74) *Attorney, Agent, or Firm* — NSIP Law

(57) ABSTRACT

A method with model optimization includes: determining a graph representing operations performed in a target model; determining an attribute of input data of the target model; determining a predicted performance of the target model based on a behavior pattern of hardware that executes the target model; and optimizing the operations performed in the target model based on the graph, the attribute of the input data, and the predicted performance of the target model.

24 Claims, 10 Drawing Sheets

(56) References Cited

U.S. PATENT DOCUMENTS

2019/0205358 A1* 7/2019 Diril ............... G06N 3/063
2019/0205736 A1  7/2019 Bleiweiss et al.
2019/0258932 A1  8/2019 Kang et al.

OTHER PUBLICATIONS

Zhang, M. et al., "Optimized compression for implementing convolutional neural networks on FPGA," Electronics vol. 8, No. 295 (Mar. 6, 2019) pp. 1-15. (Year: 2019).*
Abadi, M. et al., "TensorFlow: a system for large-scale machine learning," Proc. 12th USENIX Symp. on Operating System Design and Implementation (Nov. 2, 2016) pp. 265-283. (Year: 2016).*
Dong, X. et al., "Acorns: a framework for accelerating deep neural networks with input sparsity," 2019 28th Intl. Conf. on Parallel Architectures and Compilation Techniques (Nov. 2019) pp. 178-191. (Year: 2019).*
Agrawal, A. et al., "TensorFlow eager: a multi-stage, python-embedded dsl for machine learning," Proc. of Machine Learning and Systems (Apr. 15, 2019) pp. 178-189. (Year: 2019)*
Liu R. et al., "A bridging framework for model optimization and deep propagation," Advances in Neural Information Processing, vol. 31 (2018) 10 pp. (Year: 2018).*
Kjolstad, Fredrik et al., "The Tensor Algebra Compiler." Proceedings of the ACM on Programming Languages, vol. 1, No. OOPSLA, 2017 (pp. 1-29).
Chen, Tianqi et al., "Learning to Optimize Tensor Programs." 32nd Conference on Neural Information Processing Systems (*NeurIPS 2018*), 2018 (pp. 1-12).
Extended European Search Report issued on Mar. 24, 2021, in counterpart EP Application No. 20196339.4 (12 pages in English).
Rotem, Nadav, et al. "Glow: Graph Lowering Compiler Techniques for Neural Networks." arXiv preprint arXiv:1805.00907 (2019) (12 pages in English).
Liu, Jiawen, et al. "Processing-in-memory for energy-efficient neural network training: A heterogeneous approach." 2018 51st Annual IEEE/ACM International Symposium on Microarchitecture (MICRO). IEEE, 2018 (14 pages in English).
Hadjis, Stefan, and Kunle Olukotun. "TensorFlow to Cloud FPGAs: Tradeoffs for Accelerating Deep Neural Networks." 2019 29th International Conference on Field Programmable Logic and Applications (FPL). IEEE, 2019, (7 pages).
Rotem, Nadav, et al. "Glow: Graph lowering compiler techniques for neural networks." arXiv:1805.00907v3 [cs.PL] Apr. 3, 2019, (12 pages).
Dong, Xiao, et al. "Acorns: A Framework for Accelerating Deep Neural Networks with Input Sparsity." 2019 28th International Conference on Parallel Architectures and Compilation Techniques (PACT). IEEE, 2019, (14 pages).
Zhang, Min, et al. "Optimized Compression for Implementing Convolutional Neural Networks on FPGA." Electronics 8.3 (2019): 295., (15 pages).
Korean Office Action issued on Jun. 19, 2024, in counterpart Korean Patent Application No. V 10-2019-0163853 (5 pages in English, 13 pages in Korean).

* cited by examiner

METHOD AND APPARATUS WITH MODEL OPTIMIZATION, AND ACCELERATOR SYSTEM

CROSS-REFERENCE TO RELATED APPLICATIONS

This application claims the benefit under 35 USC § 119(a) of Korean Patent Application No. 10-2019-0163853 filed on Dec. 10, 2019 in the Korean Intellectual Property Office, the entire disclosure of which is incorporated herein by reference for all purposes.

BACKGROUND

1. Field

The following description relates to a model optimization method and apparatus, and an accelerator system including the model optimization apparatus.

2. Description of Related Art

A neural network may have a computational structure in which a large number of processing elements with simple functions are connected in parallel. Also, neural networks are widely used as new technology in various fields to solve issues that have been difficult to solve using existing methods. To solve an issue of classifying an input pattern into a specific group, the neural network employs an algorithm that simulates a learning capability. The artificial neural network may have a generalization capability of generating a relatively accurate output even for an input pattern yet to be used for learning, based on a learning result.

Research is currently being conducted on methods to improve performance by optimizing an operation performing scheme without changing an operation structure of a neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with model optimization includes: determining a graph representing operations performed in a target model; determining an attribute of input data of the target model; determining a predicted performance of the target model based on a behavior pattern of hardware that executes the target model; and optimizing the operations performed in the target model based on the graph, the attribute of the input data, and the predicted performance of the target model.

The optimizing of the operations may include optimizing a scheme of performing the operations.

The behavior pattern of the hardware may include operational data associated with any one or any combination of any two or more of a memory access pattern of the hardware, a memory latency, and a use rate of the hardware when the operations are performed.

The hardware may include an accelerator configured to perform an inference operation on the input data input to the target model based on the target model.

The attribute of the input data may indicate either one or both of whether the input data is sparse or dense and whether the input data is a blocked matrix, a diagonal matrix, or a coordinate list-based matrix.

The optimizing of the operations may include optimizing the operations performed in the target model at a point in time determined based on any one or any combination of any two or more of a degree to which the behavior pattern of the hardware is cumulative, a use rate of the hardware, whether data is input to the target model, and a predetermined period.

The determining of the attribute of the input data may include determining the attribute of the input data using a first machine learning (ML) model separate from the target model. The determining of the predicted performance of the target model may include determining the predicted performance of the target model using the target model and a second ML model separate from the first ML model.

The target model may be executed in the hardware based on the optimized operations to perform an inference operation on the input data input to the target model.

The hardware may be a user terminal in which data to be recognized using the target model is input, or a server that receives the data to be recognized from the user terminal.

The method may further include executing, by one or more processors, the target model to perform an inference operation on the input data, where the inference operation includes any one of object recognition, speech recognition, pattern recognition, computer vision, and machine translation.

In another general aspect, a non-transitory computer-readable storage medium stores instructions that, when executed by a processor, cause the processor to perform the method described above.

In another general aspect, an apparatus with model optimization includes at least one processor configured to: determine a graph representing operations performed in a target model; determine an attribute of input data of the target model; determine a predicted performance of the target model based on a behavior pattern of hardware that executes the target model; and optimize the operations performed in the target model based on the graph, the attribute of the input data, and the predicted performance of the target model.

The least one processor may be further configured to optimize the operations by optimizing a scheme of performing the operations.

The behavior pattern of the hardware may include operational data associated with any one or any combination of any two or more of a memory access pattern of the hardware, a memory latency, and a use rate of the hardware when the operations are performed.

The hardware may include an accelerator configured to perform an inference operation on the input data input to the target model based on the target model.

The attribute of the input data may indicate either one or both of whether the input data is sparse or dense and whether the input data is a blocked matrix, a diagonal matrix, or a coordinate list-based matrix.

The at least one processor may be further configured to determine the attribute of the input data using a first machine learning (ML) model separate from the target model, and determine the predicted performance of the target model using the target model and a second ML model separate from the first ML model.

The target model may be configured to be executed in the hardware based on the optimized operations to perform an inference operation on the input data input to the target model.

The hardware may include a user terminal configured to be input with data to be recognized using the target model, or a server configured to receive the data to be recognized from the user terminal.

The hardware may include: a user terminal configured to implement the target model to recognize data input to the user terminal by performing any one of an object recognition method, a speech recognition method, a pattern recognition method, a computer vision method, and machine translation method; or a server configured to receive, from the user terminal, the data input to the user terminal, and implement the target model to recognize the data input to the user terminal by performing any one of an object recognition method, a speech recognition method, a pattern recognition method, a computer vision method, and machine translation method.

In another general aspect, an accelerator system includes: a model optimization apparatus configured to optimize operations performed in a target model based on a graph representing the operations, an attribute of input data of the target model, and a predicted performance of the target model determined based on a behavior pattern of an accelerator in which the target model is executed; and an accelerator configured to perform an inference operation on the input data using a target model to which the optimized operations are applied.

The target model may include a deep neural network model. The model optimization apparatus may be further configured to optimize the operations by optimizing a scheme of performing the operations, without changing any weights in the neural network model or any connection relationships between nodes included in the neural network model.

Other features and aspects will be apparent from the following detailed description, the drawings, and the claims.

Figure 1:
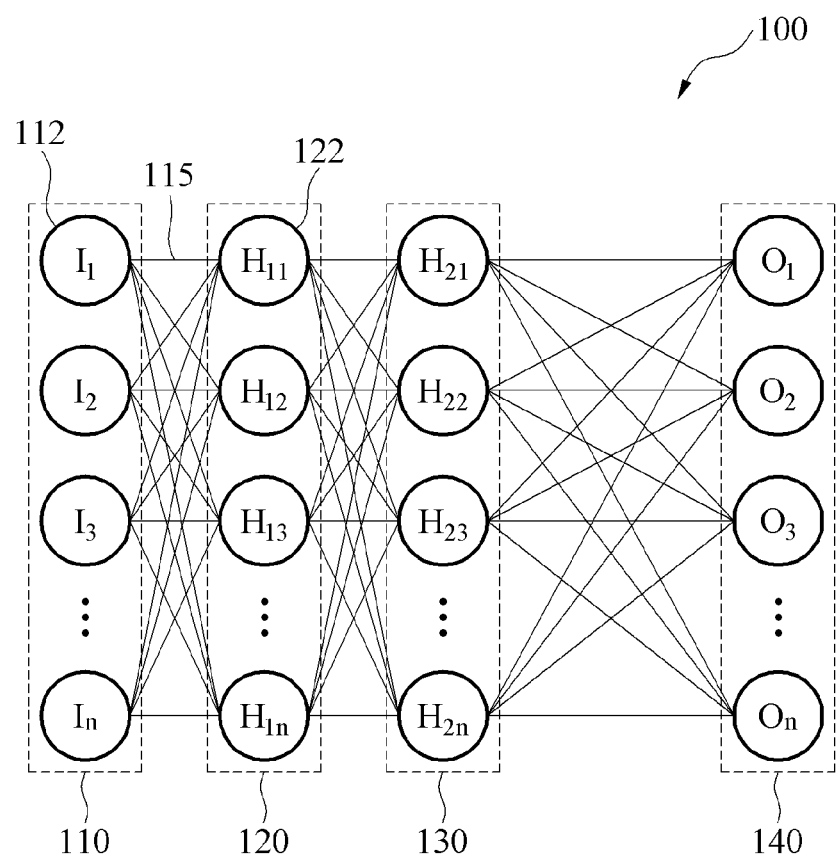
FIGS. 1 and 2 illustrate examples of a technique for optimizing a deep neural network (DNN) model based on a graph.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains, and as understood based on the disclosure herein. Terms, such as those defined in commonly used dictionaries, are to be interpreted as having a meaning that is consistent with their meaning in the context of the relevant art, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
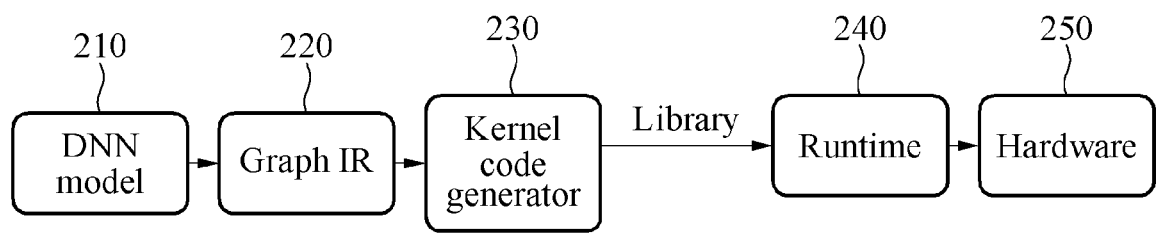

FIGS. 1 and 2 illustrate examples of a technique for optimizing a deep neural network (DNN) model based on a graph.

Referring to FIG. 1, a DNN model 100 includes a plurality of layers. For example, the plurality of layers may include an input layer 110, a plurality of hidden layers 120 and 130, and an output layer 140. Each of the layers 110, 120, 130, and 140 may include a plurality of nodes, also referred to as artificial neurons. Each node represents a computational unit having one or more inputs and outputs. The nodes are mutually connected.

The input layer 110 includes one or more nodes $I_1$ to $I_n$ to which data is directly input without going through a link in a relationship with another node. The output layer 140 includes one or more nodes $O_1$ to $O_n$ from which data is output without going through a link to another node. The hidden layers 120 and 130 correspond to remaining layers of the DNN model 100 other than the input layer 110 and the output layer 140, and include nodes $H_{11}$ to $H_{1n}$ and $H_{21}$ to $H_{2n}$ corresponding to input nodes or output nodes in relationships with other nodes. FIG. 1 illustrates the DNN model 100 as an example for ease of description, and the scope of embodiments should not be construed as being limited by the structure of the DNN model 100 described herein. DNN models of various structures may be used, according to examples. According to examples, a number of hidden layers included in the DNN model 100, a number of nodes included in each layer, and/or a connection relationship between nodes may vary.

Except for nodes of the output layer 140, an output of one node included in a layer is input to one or more nodes of another layer. For example, an output of a node 112 included in the input layer 110 is transferred to nodes including a node 122 of the hidden layer 120. Nodes are connected to each other through a link. The nodes connected through the link relatively form a relationship of an input node and an output node. As a relative concept of the input node and the output node, a node that serves as an output node in a relationship with one node may serve as an input node in a relationship with another node, and vice versa.

A connection weight is set in a link between nodes. For example, a predetermined connection weight is set in a link 115 between the node 112 and the node 122. Such connection weight may be adjusted or changed. DNN models having different connection weight values have different characteristics. The connection weight determines a degree of an influence exerted by an associated data value on a final result by increasing, reducing, or maintaining the corresponding data value. The connection weight corresponds to a parameter of the DNN model 100.

In the relationship of the input node and the output node connected through the link, an output value of the output node is determined based on data input in the input node and a connection weight set in the link between the input node and the output node. For example, when one or more input nodes are connected to one output node through corresponding links, an output value of the output node is determined based on input values input in the one or more input nodes and connection weights set in the links between the one output node and the one or more input nodes.

An output of an activation function related to weighted inputs of nodes included in a previous layer is input into each node of the hidden layers 120 and 130. The weighted inputs are obtained by multiplying inputs of the nodes included in the previous layer by a weight. The activation function includes a sigmoid, a hyperbolic tangent (tanh), and a rectified linear unit (ReLU). The weighted inputs of the nodes included in the previous layer are input into the nodes of the output layer 140. A process in which weighted data is input from a layer to a subsequent layer is referred to as "propagation."

The DNN model 100 is executed in a software framework that may operate in a hardware device such as a computer system. The DNN model 100 may include, for example, a fully connected network model, a deep convolutional network model, or a recurrent neural network model. Additionally, DNN model 100 may include other types of neural network models, such as a bi-directional neural network model or a restricted Boltzmann machine model, or may include different or overlapping neural network model portions respectively with full, convolutional, recurrent, and/or bi-directional connections. The DNN model 100 may be used in various fields such as object recognition, speech recognition, pattern recognition, computer vision, machine translation, and the like. Thus, the DNN model 100 may be a trained model implemented in a method or apparatus to perform object recognition, speech recognition, pattern recognition, computer vision, machine translation, and the like.

FIG. 2 illustrates a DNN model optimization technique as a technique for improving a performance of a DNN model 210. Output data of the DNN model 210 is determined by applying one or more operations to data input in the DNN model 210. The DNN model optimization technique is a technique for optimizing a scheme of performing one or more operations defined in the DNN model 210. For example, the optimization technique is implemented to optimize an operation performing scheme of the operations defined in the DNN model 210 at an operator level without changing a weight or a connection relationship between nodes included in the DNN model 210.

To optimize the operation performing scheme, a graph intermediate representation (IR) 220 that represents operations of the DNN model 210 is determined. The graph IR 220 represents a relationship between operations performed sequentially in the DNN model 210 based on nodes and a link, and represents a dependency of the nodes using a graph.

A kernel code generator 230 optimizes the operations defined in the DNN model 210 at the operator level based on the graph IR 220. In other words, the kernel code generator 230 may write a combination having a highest computational efficiency among various configuration schedule combinations from which a logically or mathematically same result is achieved, as a kernel code. For example, the kernel code may be determined based on an operation performing scheme optimized in consideration of whether sequentially performed operations include an operation to which a previous computation result is re-applicable, whether the operations include an operation to be parallel-processed by an accelerator and a central processing unit (CPU) included in a device as an independent operation, and whether the operations include an operation to be processed in advance. The kernel code is a code representing the operations of the DNN model 210 at an implementation level. The operations may include various operations, for example, a convolution operation, a ReLU operation, a matrix multiplication operation, and/or a linear algebra operation to be performed in the DNN model 210. However, the operations of the DNN model 210 are not limited to the aforementioned operations.

A library file in which the kernel code determined in the kernel code generator 230 is built in binary is transferred to a runtime 240. The runtime 240 enables the library file to be executed in hardware 250. As such, the DNN model 210 is operated based on the optimized operation performing scheme.

Such optimization technique may improve the performance of the DNN model 210. However, when the DNN model 210 is actually executed in the hardware 250, the optimization technique may increase an operation performing time based on a size of an internal memory (e.g., static random access memory (SRAM) and dynamic random access memory (DRAM)) of the hardware 250 performing the corresponding operation or an attribute of data input in the DNN model 210, and may also increase a latency.

According to an example, dynamic model optimization may be realized through an optimization scheme using an attribute of input data of the DNN model 210 and a predicted performance of the DNN model 210 based on a behavior pattern of the hardware 250 that executes the DNN model 210 in addition to a graph representing an attribute or a relationship between operations defined in a model, even in a case in which an attribute of data input to the DNN model 210 is changed or the hardware 250 executing the DNN model 210 is changed. In such optimization scheme, an optimization time may be effectively reduced for various hardware and models.

Figures 3A, 3B:
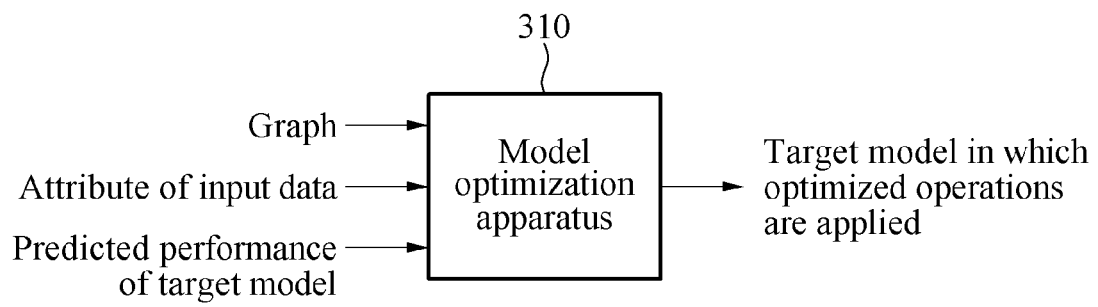
FIGS. 3A and 3B illustrate examples of a model optimization apparatus.

FIGS. 3A and 3B illustrate examples of a model optimization apparatus 310.

Referring to FIG. 3A, the model optimization apparatus 310 is an apparatus for optimizing operations defined in a target model. The model optimization apparatus 310 optimizes an operation performing scheme of the operations based on a graph representing the operations performed in the target model, an attribute of input data of the target model, and a predicted performance determined based on a behavior pattern of hardware that executes the target model, and outputs the target model in which optimized operations are reflected. The target model is, for example, a DNN model corresponding to a target for optimization.

The operation performing scheme may include either one or both of a tiling scheme applied to a matrix multiplication operation performed in the target model and a scheme of storing a result of performing a portion of the operations in a memory in hardware to apply the result to a subsequent operation.

The matrix multiplication operation to which the tiling scheme is applied may have a regularity and a high locality. As illustrated in FIG. 3B, matrices used in the matrix multiplication operation are each divided into a plurality of tiles to perform a partial matrix multiplication operation. In this example, a sum of operations results may be equal to a result of the entire matrix multiplication operation. In this case, a tile used in an operation of one portion may be repetitively used in an operation of another portion. When computing the other portion, a size of a memory to be newly prefetched for a subsequent operation is reduced, so that a computational speed close to a speed of in-memory computing may be expected. A tile of a portion on which an operation is completed may be removed to reduce a memory usage. Also, a total number of tiles may be maintained to be less than a memory budget set to prevent the memory usage occupied by the tiles from exceeding a free memory.

FIG. 3B illustrates an example of tiling matrices for a matrix multiplication operation. When performing a matrix multiplication operation that multiplies a matrix A and a matrix B and accumulates the result of the multiplication in a matrix C, the matrix multiplication operation may be performed through accumulation of partial matrix multiplication operations, for example, $C_{0,0}=(A_{0,0}*B_{0,0})+(A_{0,1}*B_{1,0})+C_{0,0}$. $A_{0,0}$, $B_{0,0}$, and $C_{0,0}$ are loaded to a memory to start the aforementioned operation, so that $A_{0,0}$ is reused for calculating $C_{0,1}$ and $B_{0,0}$ is reused for calculating $C_{1,0}$.

Although FIG. 3B illustrates an example in which tiles are divided in the same size, an optimal tiling scheme such as a size of a tile, the number of tiles, a position for division, and the like may be determined based on an attribute of input data or a model performance predicted based on a behavior pattern of hardware.

Also, an operation result obtained by performing a portion of operations may be stored in a memory and used for a subsequent operation. The operations may be classified into a plurality of stages in a pipeline structure and performed based on the stages. A result of an operation performed at one stage may be stored in the memory to be reused at a subsequent stage, which may lead to a delay. To avoid such a delay, data forwarding or data bypassing may be applied. The data forwarding is a scheme of quickly performing a subsequent operation by reading data required for the operation from an internal buffer instead of waiting until the data is loaded to the memory. The internal buffer may correspond to pipeline registers. Double buffering that efficiently processes an operation in a similar manner may also be applicable in this example. As such, the operation performing scheme of the operations defined in the target model may be optimized by controlling the scheme of storing the result obtained by performing a portion of the operations in the memory of the hardware so as to apply the result to the subsequent operation.

The hardware is, as an example, an accelerator that performs an inference operation on the input data by performing operations defined in a target model. The accelerator is, for example, a separate processor distinguished from a CPU included in a device together with the accelerator. Processing in a separate dedicated processor may be more efficient than processing in a general-purpose CPU. The accelerator may include, for example, a neural processing unit (NPU), a graphics processing unit (GPU), and a tensor processing unit (TPU).

Hereinafter, embodiments are described in more detail.

Figure 4:
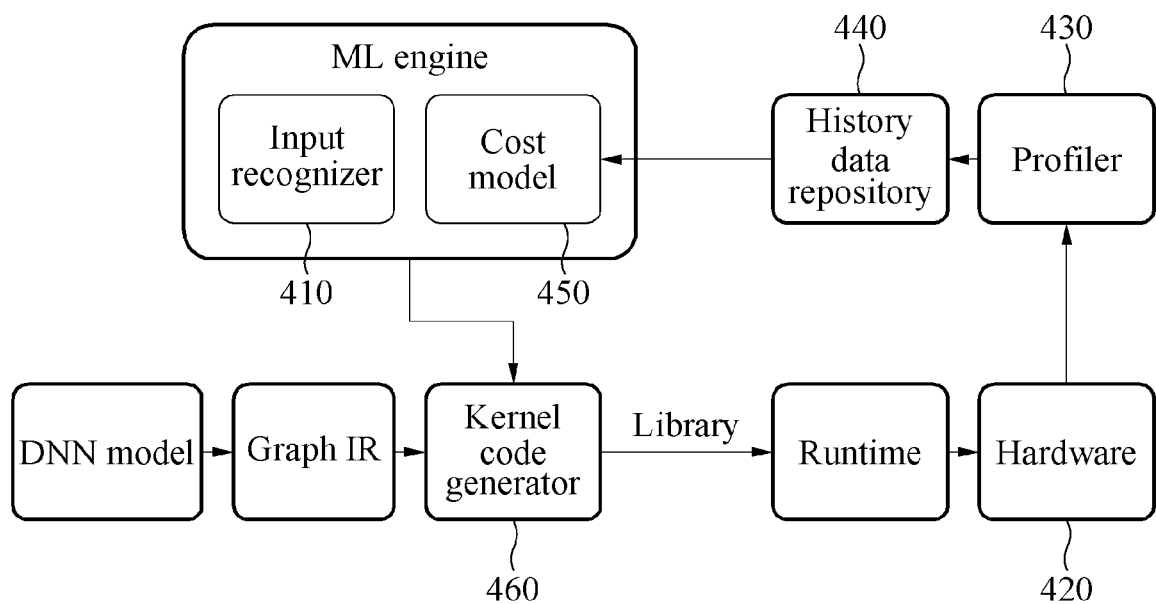
FIGS. 4 and 5 illustrate examples of a process of optimizing operations of a target model further using an attribute of input data and a predicted performance of the target model.
Figure 5:
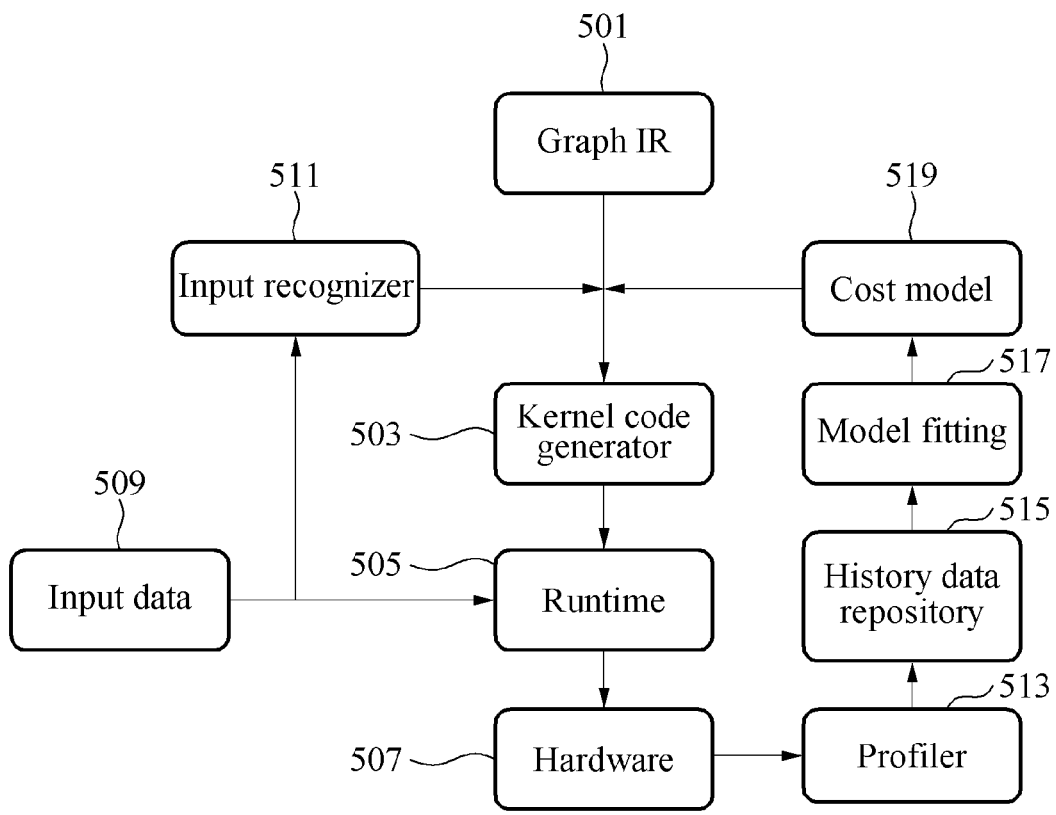

FIGS. 4 and 5 illustrate examples of a process of optimizing operations of a target model further using an attribute of input data and a predicted performance of the target model.

FIG. 4 illustrates an example of an operation of a machine learning (ML) engine used for optimizing a target model. The ML engine includes an input recognizer 410 and a cost model 450.

The input recognizer 410 determines an attribute of data input to a target model and may be implemented as a ML model. The attribute of the input data indicates, for example, a sparsity of the input data and an attribute of a sub-block in a matrix representing the input data. For example, the attribute of the input data indicates either one or both of whether the input data is sparse or dense and whether the input data is a blocked matrix, a diagonal matrix, or a coordinate list-based matrix. The ML model may include various models such as a neural network model and a regressive model (e.g., a linear regression model, a nonlinear regression model, and a multiple regression model, an autoregressive model, etc.).

The cost model 450 is, for example, an operator schedule cost model that determines a predicted performance of the target model based on a behavior pattern of hardware 420 in which the target model is executed, and may be implemented as an ML model. To determine the predicted performance of the target model, a profiler 430 may collect a behavior pattern of the hardware 420 when the target model is executed in the hardware 420. The behavior pattern includes operational data of an accelerator that performs operations defined in the target model. For example, the behavior pattern includes data associated with any one or any combination of any two or more of a memory access pattern of the hardware 420, a use rate of the hardware 420, and a CPU utilization when the operations are performed. The memory access pattern of the hardware 420 indicates, for example, a number of accesses between a DRAM and a SRAM included in an accelerator. The behavior pattern of the hardware 420 collected in the profiler 430 is stored in a history data repository 440.

Through this, the cost model 450 determines a predicted performance of the target model based on the behavior pattern of the hardware 420 stored in the history data repository 440. For example, the cost model 450 determines a model performance predicted based on any one or any combination of any two or more of the memory access pattern of the hardware 420, the memory latency, the use rate of the hardware 420, and the CPU utilization. The predicted performance of the target model may be expressed as a time, a speed, or the like of an operation performed when the target model is executed in the hardware 420.

A kernel code generator 460 may optimize a scheme of performing operations performed in the target model based on the predicted performance of the target model and the attribute of the input data determined in the ML engine as well as a graph IR, and may determine a kernel code based on the optimized scheme. A point in time for an optimizing operation performed in the kernel code generator 460 (hereinafter, referred to as "optimization operation time") may be determined based on whether an amount of behavior patterns of the hardware 420 collected in the profiler 430 and accumulated in the history data repository 440 satisfies a threshold accumulation condition. This is because an appropriate optimization is performed using cumulative behavior patterns corresponding to a level greater than or equal to a predetermined level. Also, the optimization operation time may be determined based on whether the use rate of the hardware 420 satisfies a threshold rate condition. The optimization operation may be performed at a vacation time at which the use rate of the hardware 420 is less than a predetermined condition, thereby achieving increased efficiency in device utilization. In addition, the optimization operation time may be determined based on a predetermined period, so that the optimization operation is performed continuously. Also, the optimization operation time may be determined based on whether data is input to the target model, so that the optimization may be quickly performed even if data of a new attribute is input. In some cases, the aforementioned factors are comprehensively implemented to determine the optimization operation time.

A library file, in which a kernel code determined in the kernel code generator 460 is built in binary, may be transferred to a runtime, so that a target model of an operation performing scheme optimized in the hardware 420 is executed. Also, the profiler 430 may collect a behavior pattern of the hardware 420 that executes the target model of the optimized operation performing scheme, so that the operation performing scheme of the target model is consistently updated.

FIG. 5 illustrates an example of a process of optimizing a target model.

Referring to FIG. 5, a graph IR 501 representing operations of a target model is transferred to a kernel code generator 503. For example, an attribute of input data 509 output from an input recognizer 511 and a predicted performance of the target model output from a cost model 519 are transferred to the kernel code generator 503. A library file in which a kernel code determined in the kernel code generator 503 is built in binary is transferred to a runtime 505 to be executed in hardware 507. The target model executed in the hardware 507 performs an inference operation on the input data 509.

When the target model is executed, a behavior pattern of the hardware 507 is collected by a profiler 513 and stored in a history data repository 515. Based on the behavior pattern, the cost model 519 is determined in a model fitting 517. In the model fitting 517, one or more parameters applied to an ML model corresponding to the cost model 519 may be adjusted. In other words, the model fitting 517 is a process of training the cost model 519 based on the behavior pattern of the hardware 507 stored in the history data repository 515.

The cost model 519 may be implemented as an ML model, which is a separate model from the target model, and may be an ML model determined in the model fitting 517. The model fitting 517 is performed in a case in which behavior patterns of the hardware 507 are accumulated to exceed a predetermined level, a case in which a use rate of the hardware 507 is less than or equal to a predetermined level, and/or a case in which a predetermined period elapses, for example.

Figure 6:
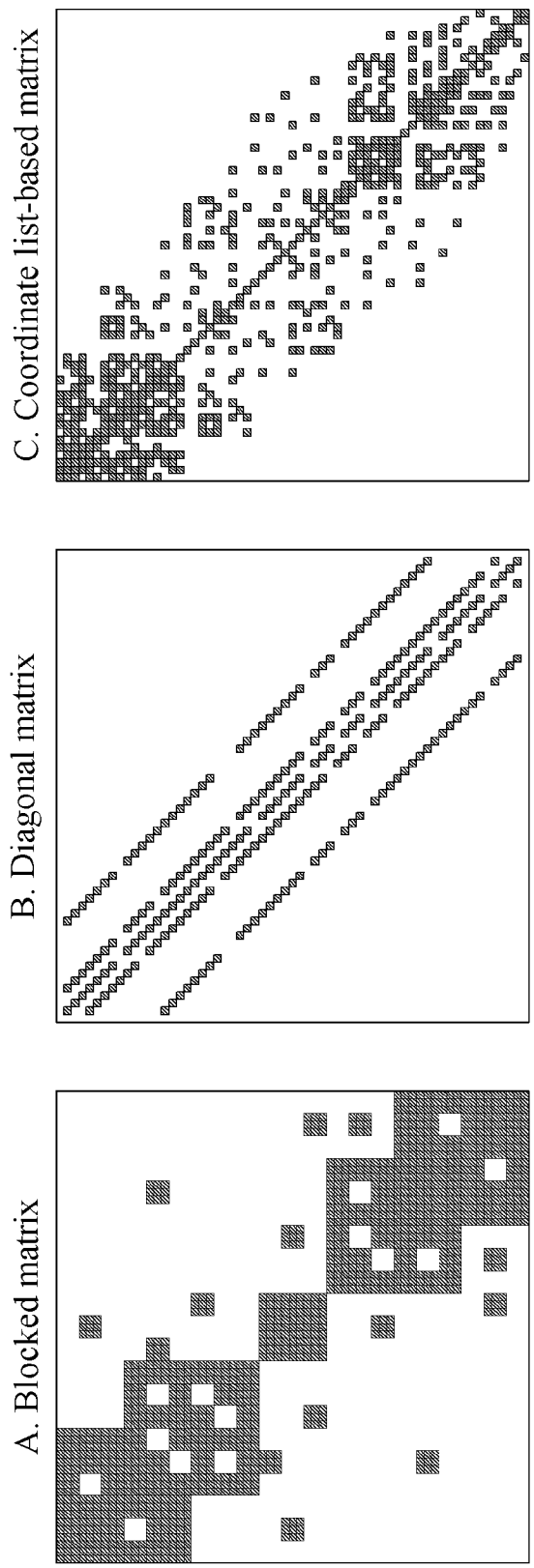
FIG. 6 illustrates an example of an attribute of input data.

FIG. 6 illustrates an example of an attribute of input data.

FIG. 6 illustrates a blocked matrix, a diagonal matrix, and a coordinate list-based matrix. When the input data is in a form of the blocked matrix, in a tiling scheme applied to a matrix multiplication operation, a tile is determined to correspond to a sub-block included in the input data. When the input data is in a form of the diagonal matrix or the coordinate list-based matrix, an operation performing scheme suitable for the corresponding form is determined. FIG. 6 illustrates merely an example for explaining an attribute of input data, and other various forms that represent an attribute of input data may be applied without restrictions.

Figure 7:
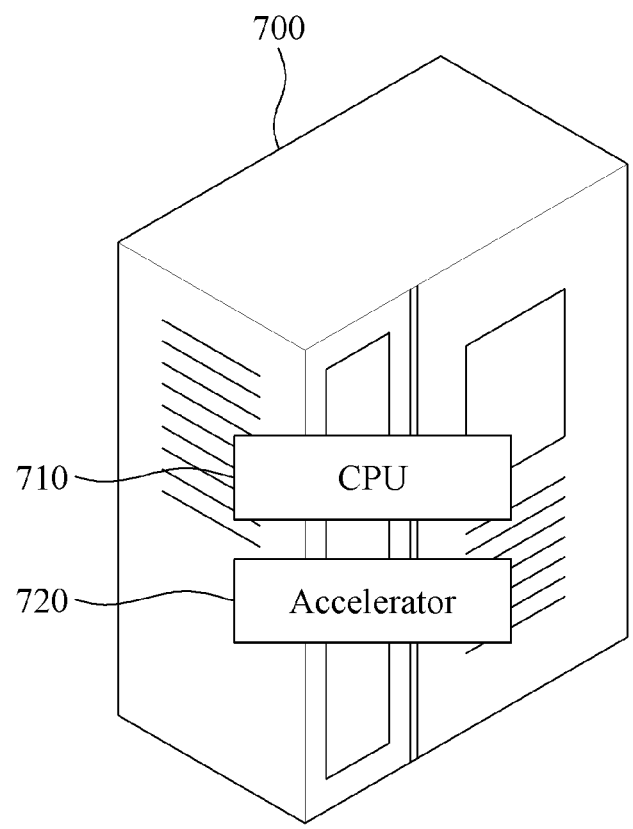
FIGS. 7 and 8 illustrate examples of a model optimization apparatus.
Figure 8:
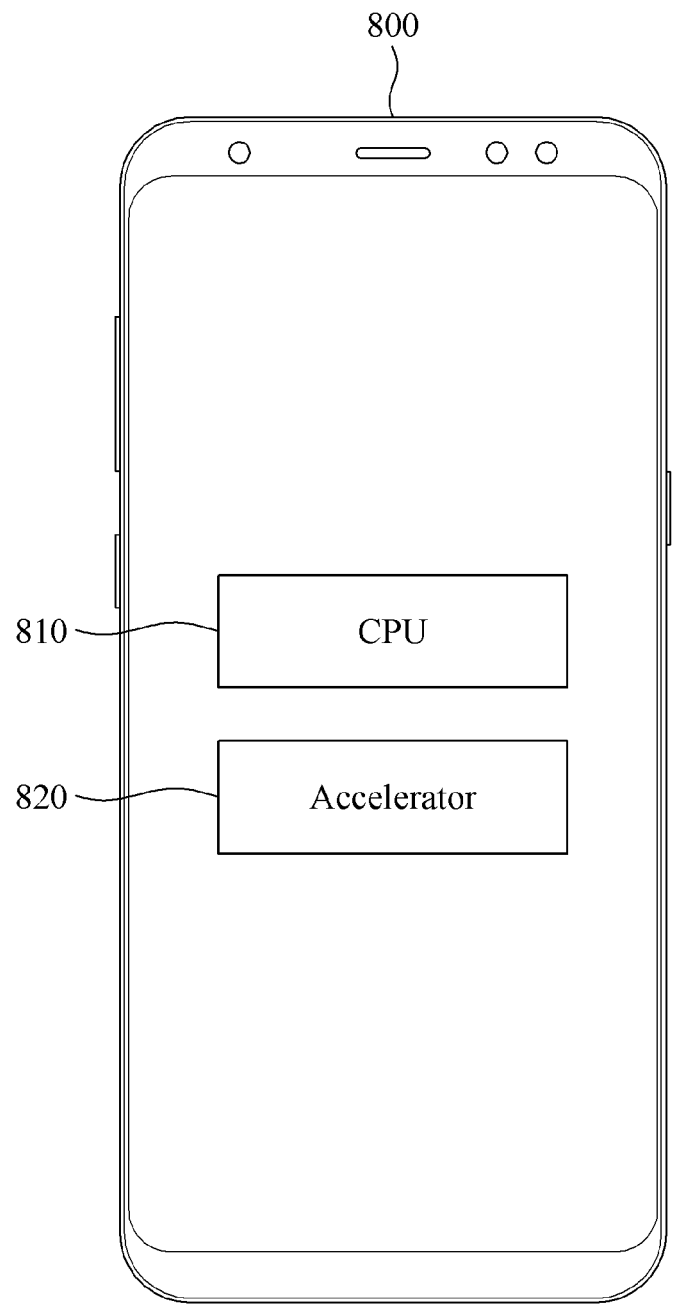

FIGS. 7 and 8 illustrate examples of a model optimization apparatus.

Referring to FIG. 7, a server 700 may include a CPU 710 and an accelerator 720. The CPU 710 may perform the above-described operations for model optimization. An optimized target model may be executed in the accelerator 720 to perform an inference operation on the input data. In an example, the server 700 corresponds to an accelerator system.

Input data may be transmitted from a user terminal to the server 700 through a wired and/or wireless network. The user terminal is a device that receives data to be recognized through a target mode and may include various computing devices such as a smartphone, a personal computer (PC), a tablet PC, a laptop computer, and the like, various wearable devices such as a smartwatch, a smart glass, and the like, a smart car, a smart kiosk, and Internet of Things (IoT) devices, for example. The accelerator 720 may execute the target model to perform an inference operation on the input data. A result of the inferring may be transmitted to the user terminal, so that the user terminal performs a subsequent processing based on the result of the inference operation.

Referring to FIG. 8, a user terminal 800 includes a CPU 810 and an accelerator 820. The CPU 810 may perform the above-described operations for model optimization. An optimized target model may be executed in the accelerator 820 to perform an inference operation on input data. In an example, the user terminal 800 corresponds to an accelerator system. The input data may be directly input to the user terminal 800, so that the user terminal 800 performs a subsequent processing based on the result of the inference operation. Although FIG. 8 illustrates a smartphone as an example of the user terminal 800 for ease of description, the user terminal 800 may be embodied by various other devices, without restrictions.

Figure 9:
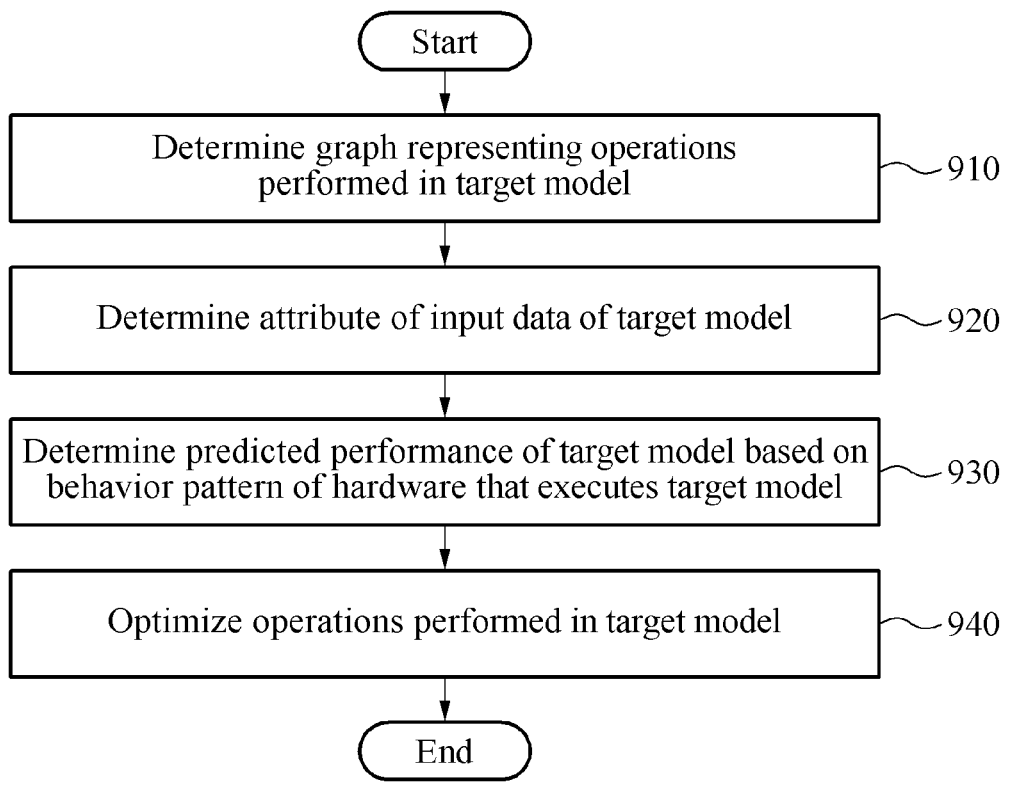
FIG. 9 illustrates an example of a model optimization method.

FIG. 9 illustrates an example of a model optimization method.

Referring to FIG. 9, a model optimization method may be performed by a processor included in a model optimization apparatus.

In operation 910, the model optimization apparatus determines a graph representing operations performed in a target model.

In operation 920, the model optimization apparatus determines an attribute of input data of the target model. The attribute of the input data may indicate either one or both of whether the input data is sparse or dense and whether the input data is a blocked matrix, a diagonal matrix, or a coordinate list-based matrix.

In operation 930, the model optimization apparatus determines a predicted performance of the target model based on a behavior pattern of hardware that executes the target model. The behavior pattern of the hardware may include operational data associated with any one or any combination of any two or more of a memory access pattern of the hardware, a memory latency, and a use rate of the hardware when the operations are performed. The predicted performance of the target model may be expressed as, for example, a time and a speed of an operation performed when the target model is executed in the hardware.

In operation 940, the model optimization apparatus optimizes the operations performed in the target model based on the graph, the attribute of the input data, and the predicted performance of the target model. The model optimization apparatus optimizes an operation performing scheme of the operations performed in the target model. The operation performing scheme may include either one or both of a tiling scheme applied to a matrix multiplication operation performed in the target model and a scheme of storing a result of performing a portion of the operations in a memory in the hardware to apply the result to a subsequent operation.

The model optimization apparatus may optimize the operations performed in the target model such that a number of accesses between DRAM and SRAM included in the hardware is minimized when the operations are performed in the hardware. Also, the model optimization apparatus may optimize the operations performed in the target model such that a memory latency of a memory included in the hardware is minimized when the operations are performed in the hardware.

Since the description of FIGS. 1 through 8 applies to operations of FIG. 9, a repeated description will be omitted here, in the interest of conciseness.

Figure 10:
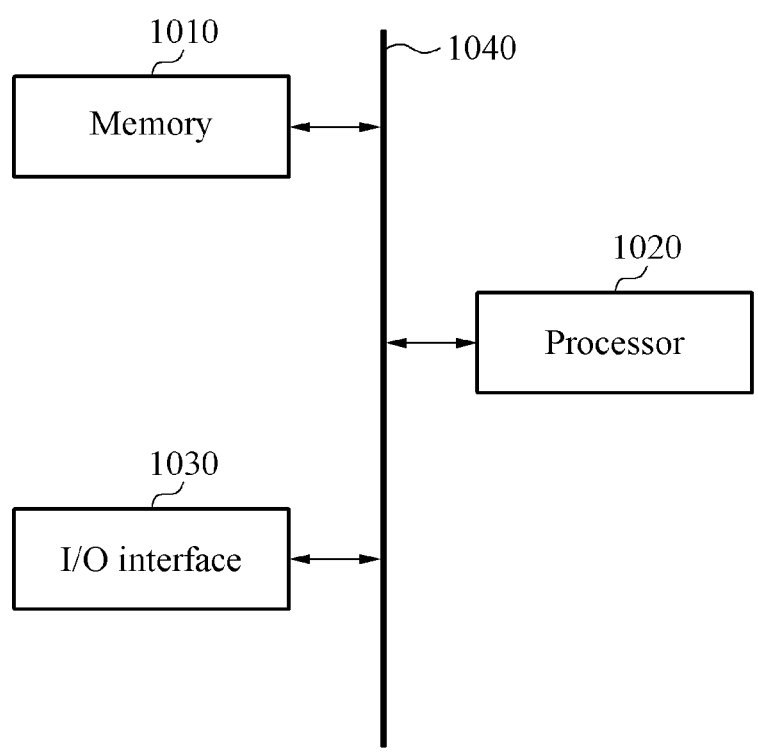
FIG. 10 illustrates an example of a model optimization apparatus.

FIG. 10 illustrates an example of a model optimization apparatus 1000.

Referring to FIG. 10, the model optimization apparatus 1000 may include a memory 1010, a processor 1020, and an input and output (I/O) interface 1030. The memory 1010, the processor 1020, and the I/O interface 1030 may communicate through a bus 1040.

The memory 1010 includes computer-readable instructions. The processor 1020 may perform the above-described operations in response to the instructions in the memory 1010 being executed by the processor 1020. The memory 1010 may be a volatile memory or a non-volatile memory.

The processor 1020 is a device for executing instructions or programs, or controlling the model optimization apparatus 1000. The processor 1020 includes, for example, a CPU. The model optimization apparatus 1000 may be connected to another device, for example, an accelerator through the I/O interface 1030 to perform data exchange. In addition, the model optimization apparatus 1000 may perform the operations described above.

The hardware 250, 420, and 507, the model optimization apparatuses 310 and 1000, the server 700, the CPUs 710 and 810, the accelerators 720 and 820, the user terminal 800, the memory 1010, the processor 1020, the I/O interface 1030, the bus 1040, the processors, the memories, and other components and devices in FIGS. 1 to 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with model optimization, comprising:
    determining a graph representing operations to be performed in a target model related to input data input into the target model;
    determining, by using a first machine learning (ML) model, separate from the target model, the first ML model receiving the input data, an attribute of the input data based on the inputted input data;
    determining a predicted performance of the target model based on a behavior pattern of hardware that executes the target model;
    optimizing the operations performed in the target model based on the graph, the attribute of the input data, and the predicted performance of the target model; and
    executing the target model, including inputting the input data to the target model, by the hardware according to the optimized operations.

2. The method of claim 1, wherein the optimizing of the operations comprises optimizing a scheme of performing the operations.

3. The method of claim 1, wherein the determining of the predicted performance of the target model is based on behavior patterns of the hardware, where the behavior patterns of the hardware comprise operational data associated with any one or any combination of any two or more of a memory access pattern of the hardware, a memory latency, and a use rate of the hardware when the operations are performed.

4. The method of claim 1, wherein the hardware comprises an accelerator configured to perform the executing.

5. The method of claim 1, wherein the attribute of the input data indicates either one or both of whether the input data is sparse or dense and whether the input data is a blocked matrix, a diagonal matrix, or a coordinate list-based matrix.

6. The method of claim 1, wherein the optimizing of the operations comprises optimizing the operations performed in the target model at a point in time determined based on any one or any combination of any two or more of a degree to which the behavior pattern of the hardware is cumulative, a use rate of the hardware, whether the input data is input to the target model, and a predetermined period.

7. The method of claim 1,
wherein the determining of the predicted performance of the target model comprises determining the predicted performance of the target model using the target model and a second ML model separate from the first ML model.

8. The method of claim 1, wherein the hardware is a user terminal and the input data is input to or captured by the input terminal, or the hardware is a server that receives the input data from the user terminal.

9. The method of claim 1,
wherein the executing is performed by one or more processors distinct from one or more other processors that perform the determining of the graph, the determining of the attribute, the determining of the predicted performance, and/or the optimizing, and
wherein the target model is configured to perform any one of object recognition, speech recognition, pattern recognition, computer vision, and machine translation.

10. The method of claim 1, wherein the optimizing comprises generating a first operation performing scheme configured to repetitively use a tile used in one of the operations for one or more different ones of the operations, thereby reducing operation time and memory usage for the operations of the target model.

11. The method of claim 10, wherein the optimizing comprises using an amount of behavior patterns of the hardware, which corresponds to a level greater than or equal to a predetermined level.

12. The method of claim 10, wherein the optimizing comprises generating a second operation performing scheme configured to store a result of performing one of the operations in a memory in the hardware to apply the result to a subsequent one of the operations.

13. The method of claim 12, wherein the optimizing comprises performing a combination of the first operation performing scheme and the second operation performing scheme.

14. A non-transitory computer-readable storage medium storing instructions that, when executed by a processor, cause the processor to
determine a graph representing plural operations performed in a target model related to input data input into the target model;
determine an attribute of the input data of the target model by a first machine learning (ML) model receiving the input data based on the inputted input data;
determine a predicted performance of the target model based on cumulative behavior patterns, over plural times, of hardware that respectively executed the target model at the plural times;
optimize the plural operations to be performed in the target model based on the graph, the attribute of the input data, and the predicted performance of the target model; and
execute the target model, including inputting the input data to the target model, by the hardware according to the optimized operations.

15. A system with model optimization, comprising:
one or more first processors configured to:
determine a graph representing operations to be performed in a target model related to input data input into the target model;
determine, by using a first machine learning (ML) model, separate from the target model, the first ML model receiving the input data, an attribute of the input data based on the inputted input data;
determine a predicted performance of the target model based on a behavior pattern of hardware that executes the target model; and
optimize the operations performed in the target model based on the graph, the attribute of the input data, and the predicted performance of the target model; and
one or more second processors, as the hardware, configured to execute the target model according to the optimized operations, with the execution of the target model including an input of the input data to the target model.

16. The system of claim 15, wherein, for the optimization of the operations, the one or more first processors are configured to optimize the operations by optimizing a scheme of performing the operations.

17. The system of claim 15, wherein, for the determination of the predicted performance of the target model, the one or more first processors are configured determine the predicted performance based on behavior patterns of the hardware, and
wherein the behavior patterns of the hardware comprise operational data associated with any one or any combination of any two or more of a memory access pattern of the hardware, a memory latency, and a use rate of the hardware when the operations are performed.

18. The system of claim 15, wherein the hardware comprises an accelerator, which includes the one or more second processors, configured to perform the execution of the target model.

19. The system of claim 15, wherein the attribute of the input data indicates either one or both of whether the input data is sparse or dense and whether the input data is a blocked matrix, a diagonal matrix, or a coordinate list-based matrix.

20. The system of claim 15,
wherein, for the determination of the predicted performance, the one or more first processors are configured to determine the predicted performance of the target model using the target model and a second ML model separate from the first ML model.

21. The system of claim 15, wherein the hardware is a user terminal and the input data is input to or captured by the input terminal, or the hardware is a server configured to receive the input data from the user terminal.

22. The system of claim 15, wherein the hardware comprises:
a user terminal that includes the one or more first processors that are distinct from the one or more second processors, and the target model is configured to perform any one of an object recognition method, a speech recognition method, a pattern recognition method, a computer vision method, and machine translation method; or
a server that includes the one or more second processors, and the target model is configured to receive, from a terminal, the input data input to or captured by the terminal, and the target model is configured perform any one of the object recognition method, the speech recognition method, the pattern recognition method, the computer vision method, and the machine translation method.

23. The system of claim 15, wherein the system is a user terminal that comprises an accelerator that includes the one or more second processors, with the one or more first processors being distinct from the accelerator.

24. The system of claim 23, wherein the target model comprises a deep neural network model, and wherein the optimization of the operations and the execution of the target model are respectively performed without changing any weights in the deep neural network model or any connection relationships between nodes included in the deep neural network model.

* * * * *